Oct. 31, 1933.  C. E. WARREN  1,933,156
MILK COOLER
Filed Sept. 14, 1932    2 Sheets-Sheet 1

Inventor
Clare E. Warren
Samuel H. Davis
Attorney

Oct. 31, 1933.   C. E. WARREN   1,933,156
MILK COOLER
Filed Sept. 14, 1932   2 Sheets-Sheet 2

Inventor
Clare E. Warren
By Samuel H. Davis
Attorney

Patented Oct. 31, 1933

1,933,156

UNITED STATES PATENT OFFICE 1,933,156

MILK COOLER

Clare E. Warren, Lansing, Mich.

Application September 14, 1932
Serial No. 633,211

7 Claims. (Cl. 257—74)

This invention relates to milk coolers adapted to be placed bodily in milk cans, and lifted therefrom. The invention belongs to that class of cooling apparatus which is designed for the circulation of cold water, and provided with stirrers or agitators suitably placed to set the milk in motion against the cooling surfaces. Means are also provided for disturbing the water flowing through the cooling barrels or casings in order that all surfaces may be thoroughly cooled. In practice the casings and tubes are constructed of dairy tin, and the shaft of monel metal, but the invention is not limited to any particular materials. All parts are rust proof, and there are no raw edges that come into contact with the milk.

Figure 1:
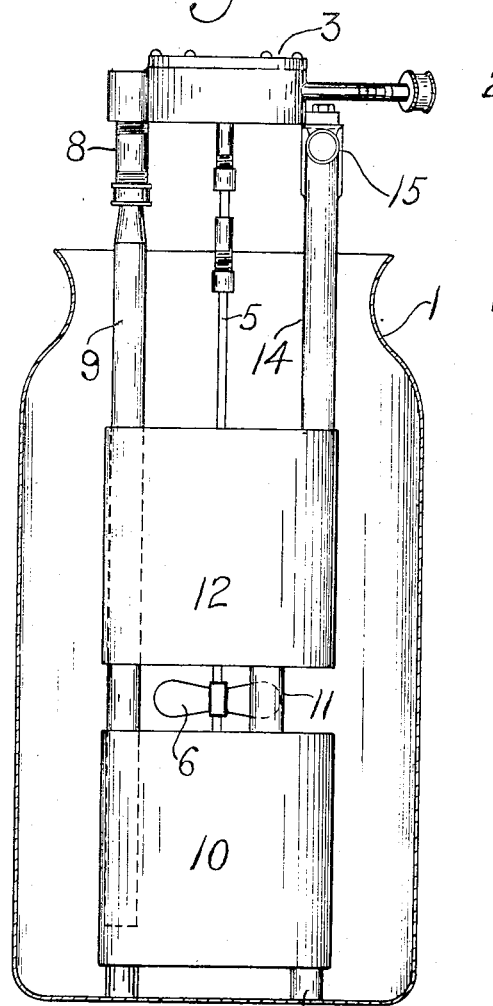
Figure 2:
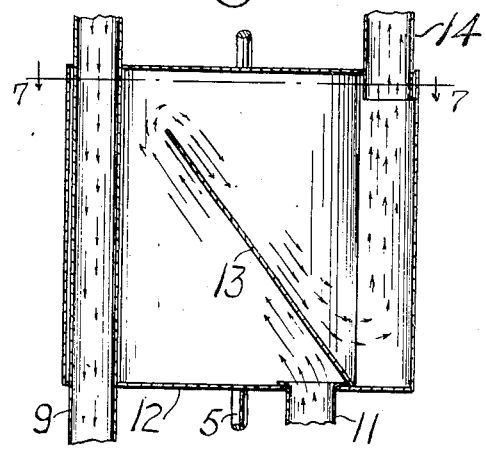
Figure 3:
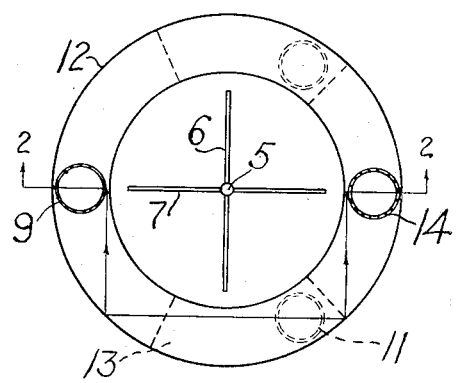
Figure 7:
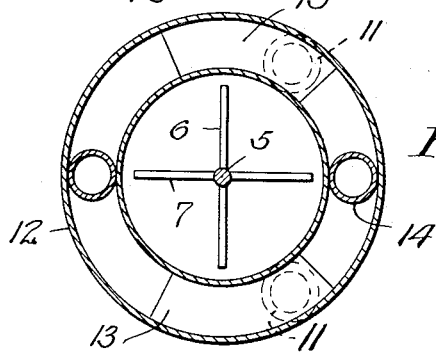
Figure 4:
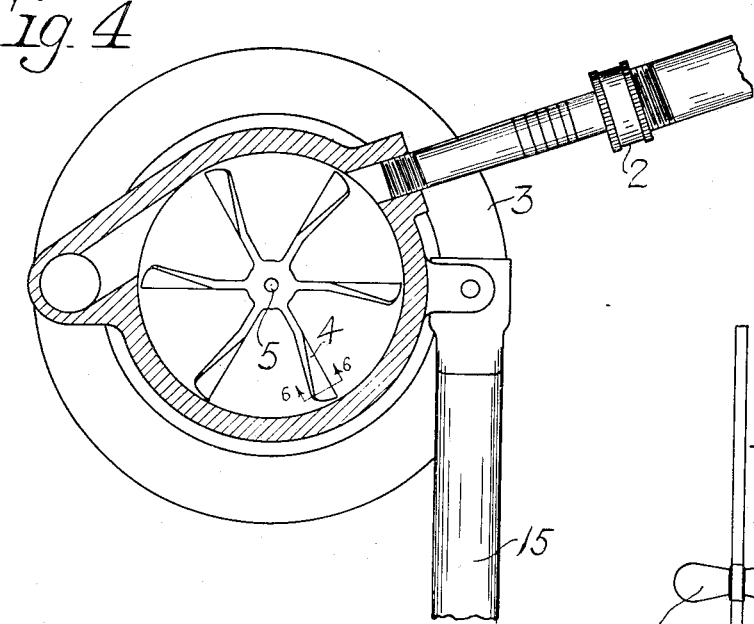
Figure 5:
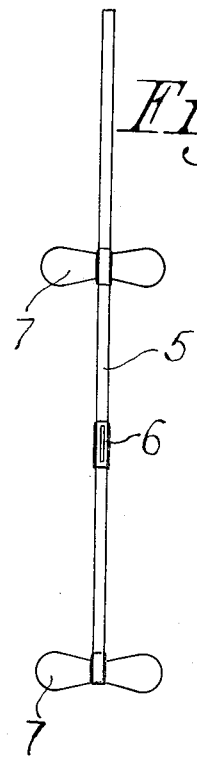
Figure 6:
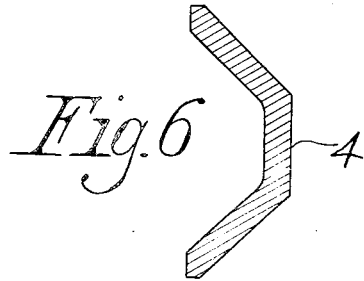

The object of this invention is the production of a milk or other fluid cooler, having the special construction and arrangement of parts illustrated in the accompanying drawings forming a portion of this application. Of the drawings, Fig. 1 represents a vertical section of a milk can with this invention applied therein. Fig. 2 is a sectional view of the upper cooler casing, somewhat enlarged, the section being taken upon the broken line 2—2 of Fig. 3. Fig. 3 is a top view of the upper cooler barrel or casing showing a stirrer in position, and the inlet and discharge pipes in section. Fig. 4 represents a horizontal section through the top or water wheel casing, showing the water inlet connection, the water motor or wheel, and the outlet through which the water passes to the cooler casings. The connection of the discharge pipe with the top casing is also set forth. Fig. 5 is a view of the vertical shaft removed, with the stirrers attached. Fig. 6 is a cross-section of one of the blades of the water wheel showing the preferred form thereof. Fig. 7 is a horizontal cross section of the upper cooler casing taken on the broken line 7—7 of Fig. 2 showing the annular chamber between the inner and outer walls of the casing and the inclined baffle plates therein.

Throughout the description and drawings the same number is used to refer to the same part.

Considering the drawings, a milk can 1 is shown in Fig. 1 with this invention in operative position therein. The invention comprises an inlet 2 for water under pressure. The water may be previously cooled to a desired temperature in suitable apparatus not shown. Inlet 2 is connected with a top casing 3 of any chosen structure, having therein a water wheel 4 on the upper end of a vertical shaft 5. The blades of the wheel may advantageously have the shape illustrated in Fig. 6, the object being to have the water hit the blades in the middle and be deflected both ways from the center. A balanced, even and very strong rotation of the shaft results with economical use of water power.

As shown in Fig. 5, the shaft 5 is provided with a number of bladed stirrers like 6 and 7, usually placed as illustrated, but this invention is not limited to the arrangement as shown.

Returning to Fig. 1, a connection 8 couples the top casing with the down water pipe 9 which passes through the upper cooler casing and opens above the bottom of the lower cooler casing 10. A short pipe 11 connects the lower cooler casing 10 with the upper cooler casing 12 as set out in Figs. 1 and 2. In Figs. 3 and 7 it will be noted that there are two short pipes 11 spaced apart and entering the chamber for the cooling fluid between the outer and inner walls of the casing.

It will be noted in Fig. 3 that the cooler casings are of cylindrical form with vertical concentric passages therein. In other words, the chamber for the cooling water within the casing has the annular shape as indicated in Fig. 2. Within the curving chambers are arranged water baffles 13 in an inclined position and corresponding to the curving walls of the annular chambers of the casings. It will be seen from Figs. 3 and 7 that there are two inclined baffle plates 13 and that the two short pipes 11 enter the annular cooling chamber beneath the baffles. The flowing water is thereby thrown about within the cooler casings, and all surfaces are cooled. In Fig. 2 it will be noted further that the short pipe 11 opens into the upper cooler casing 12 just below the baffle 13. There may be two or more pipes 11 and baffles on opposite sides as indicated by the broken lines. Water leaves the upper cooling casing 12 by way of the discharge pipe 14 and orifice 15. Pipe 14 is in practice connected with the wheel casing 3, in order that the cooler may be introduced and taken out of the milk can bodily. The members 16 and 17 shown in Fig. 1 are tubular feet supporting the lower cooling casing 10 above the bottom of the milk can, in order that the milk may pass beneath the casing.

The operation is apparent. Milk surrounds the pipes and cooler casings, and is kept stirred by the paddles 6 and 7, one stirrer being usually disposed in the cylindrical passage of each cooler casing, as indicated in Fig. 3, and one between the upper and lower cooler casing as shown in Fig. 1. It is believed to be now clear that both the cooling water and the milk are kept in a state of agitation during the operation.

Having now described this invention and the manner of its use, I claim:—

1. In a milk cooler adapted to be placed in a milk can, the combination with an inlet for water under pressure, of a top casing, a water wheel in the casing arranged to be driven by the entering fluid, a vertical shaft connected with the said water wheel, stirrers attached to the said shaft, an annular cooler casing having a vertical passage, inlet and discharge water pipes connected with said cooler casing, said inlet pipe being connected with the top casing, and water baffles within the said cooler casing arranged in the path of the water flowing through the said cooler casing.

2. In a milk cooler adapted to be placed in a milk can, the combination with an inlet for water under pressure, of a top casing, a water wheel in the casing arranged to be driven by the entering fluid, a vertical shaft connected with the said water wheel, stirrers attached to the shaft, an annular cooler casing having an interior vertical passage, inlet and discharge pipes connected with the said cooler casing and with the said top casing whereby water is passed through the cooler casing, and water baffles within the cooler casing in the path of the water.

3. In a milk cooler adapted to be placed in a milk can, the combination with an inlet for water under pressure, of a top casing, a water wheel in the casing arranged to be driven by the entering fluid, a vertical shaft connected with the said water wheel, stirrers attached to the shaft, an annular cooler casing cylindrical in form and having a vertical cylindrical passage, inlet and discharge pipes connecting the said cooler casing with the said top casing whereby water is passed through the cooler casing, and curving and inclined baffles arranged within the said cooler casing to agitate the water flowing through the casing.

4. In a milk cooler adapted to be placed in a milk can, the combination with an inlet for water under pressure, of a top casing, a water wheel in the casing arranged to be driven by the entering fluid, a vertical shaft connected with the said water wheel, stirrers attached to the said shaft, a plurality of cooler casings arranged one above another and each having a vertical passage, inlet and discharge pipes connected with said top casing and with said cooler casings for passing water through the cooler casings, and water baffles within the said cooler casings arranged in the path of the water flowing through the said cooler casings.

5. In a milk cooler adapted to be placed in a milk can, the combination with an inlet for water under pressure, of a top casing, a water wheel in the casing arranged to be driven by the entering fluid, a vertical shaft connected with the said water wheel, stirrers attached to the shaft, a plurality of cooler casings arranged one above another and each having an interior vertical passage, one of said stirrers being located in each passage, inlet and discharge water pipes connected with the said cooler casings and with the top casing whereby water is passed through the said cooler casings, and water baffles within the cooler casings arranged in the path of the water flow.

6. In a milk cooler adapted to be placed in a milk can, the combination with an inlet for water under pressure, of a top casing, a water wheel in the casing arranged to be driven by the entering fluid, a vertical shaft connected with the said water wheel, stirrers attached to the shaft, a plurality of cooler casings cylindrical in form and having vertical cylindrical passages, said cooler casings being one above another, one of said stirrers being located in each passage, inlet and discharge pipes connected with said cooler casings and with said top casing, and curving and inclined water baffles in said cooler casings.

7. In a milk cooler adapted to be placed in a milk can, the combination with a plurality of hollow casings arranged one above another, of tubular connections whereby cooling fluid may be passed from the exterior through the casings, a fluid motor located in one of the casings in the path of the cooling fluid and having a vertical shaft, and a stirrer carried by said shaft.

CLARE E. WARREN.